United States Patent [19]

Lipo

[11] 4,112,339
[45] Sep. 5, 1978

[54] MEASUREMENT OF PULSATING TORQUE IN A CURRENT SOURCE INVERTER MOTOR DRIVE

[75] Inventor: Thomas A. Lipo, Schenectady, N.Y.

[73] Assignee: General Electric Company, Schenectady, N.Y.

[21] Appl. No.: 817,625

[22] Filed: Jul. 21, 1977

[51] Int. Cl.² .............................................. H02P 5/40
[52] U.S. Cl. ..................................... 318/227; 318/230
[58] Field of Search ........................ 318/227, 230, 231

[56] References Cited

U.S. PATENT DOCUMENTS

| 3,805,135 | 4/1974 | Blaschke | 318/227 |
| 3,824,437 | 7/1974 | Blaschke | 318/227 |
| 3,919,609 | 11/1975 | Klautschek et al. | 318/227 |
| 4,011,489 | 3/1977 | Franz et al. | 318/227 |
| 4,041,361 | 8/1977 | Cornell | 318/227 |
| 4,044,285 | 8/1977 | Plunkett et al. | 318/227 |

Primary Examiner—Gene Z. Rubinson
Attorney, Agent, or Firm—Donald R. Campbell; Joseph T. Cohen; Marvin Snyder

[57] ABSTRACT

A method and circuit for calculating the instantaneous pulsating component of torque for use as a cogging feedback signal to stabilize ac motors at low frequencies. An air gap flux signal is generated by integrating the instantaneous voltage across a stator phase winding during the interval the current in that winding is zero. Pulsating torque is the product of the high pass filtered flux signal and the inverter input or dc link current.

10 Claims, 6 Drawing Figures

MEASUREMENT OF PULSATING TORQUE IN A CURRENT SOURCE INVERTER MOTOR DRIVE

BACKGROUND OF THE INVENTION

This invention relates to a circuit and method for measuring pulsating torque in ac motors operating from a current source inverter, and more particularly to a scheme for the on-line computation of the instantaneous pulsating component of electromagnetic torque without the need for search or flux sensing coils in the machine.

Many applications including traction drive systems require the precise regulation of motor torque. The development of current source or controlled current inverters, which supply rectangular non-sinusoidal currents to the motor windings, has resulted in efforts to apply this device to adjustable speed ac induction motor drives. One of the weaknesses of present control strategies is that the torque pulsations due to the harmonic or cogging component of electromagnetic torque can be severe at very low machine frequencies and result in instabilities and uneven running. For a six-pulse, polyphase full wave bridge inverter, torque ripple occurs because of the presence of the sixth, twelfth, and eighteenth harmonic components in the non-sinusoidal motor current in addition to the fundamental motor frequency. The torque pulsations are especially troublesome upon starting up or when passing through zero speed to reverse the direction of rotation, and can be eliminated by modulating the input dc current fed to the inverter.

In practice, motor parameters vary with temperature and frequency so that actual real-time measurement of the pulsating torque and closed-loop feedback control is necessary for the precise regulation of torque rather than relying on open loop compensation. A closed loop technique for reducing torque ripple which requires the continuous calculation of torque from the sensed motor voltage and current is disclosed in U.S. Pat. No. 3,919,609 to Klautschek et al., however the torque calculated in this case is the total or shaft plus pulsating torque. Other prior art techniques for calculating torque use flux coils embedded in the stator slots of the machine. The present invention realizes means for calculating only the instantaneous pulsating component of electromagnetic torque, which is exact and independent of changes in motor parameters and is implemented by the sensing of readily available currents and motor terminal voltages. Utilization of the change of instantaneous torque signal as a decogging feedback control variable in a controlled current inverter motor drive is disclosed and claimed in the concurrently filed application, Ser. No. 817,626 by the inventor, which is assigned to the same assignee as this invention.

SUMMARY OF THE INVENTION

In an induction machine operated from a polyphase current source inverter that supplies noncontinuous rectangular currents to the stator windings, there is an instantaneous voltage across an open-circuited stator phase winding which corresponds to the air gap voltage, and the integral of this voltage is the motor air gap flux. Instantaneous torque is the product of the mutually perpendicular air gap flux and stator current, which in the case of a current source inverter is easily measured by sensing the dc link or inverter input current (or by sensing the inverter output current). Thus, on-line computation of the pulsating component of torque is realized without requiring search coils in the machine. The method and circuit for measuring ripple torque are applicable also to synchronous machines and to load commutated synchronous machines.

In the exemplary embodiment, the pulsating torque measuring circuit includes means for generating signals representative of the inverter input current, the zero current intervals in each phase winding, and the instantaneous voltage across each phase winding sensed at the motor terminals. A pulsating torque computation circuit comprises means for successively integrating each phase winding voltage during the interval the current in that winding is zero to thereby produce signals representative of motor air gap flux; means for alternately inverting and summing the opposite polarity flux signals; means for high pass filtering the summed flux signals to reject the dc portion; and means for multiplying the filtered flux signals by the dc link current signal to generate an output representing the instantaneous pulsating component of electromagnetic torque. To control switching in the computation circuit, the gating signals for the inverter thyristors are processed to derive signals corresponding to the conduction intervals of the thyristors which are in turn applied to logic gates.

DESCRIPTION OF THE PREFERRED EMBODIMENT

Figure 1:
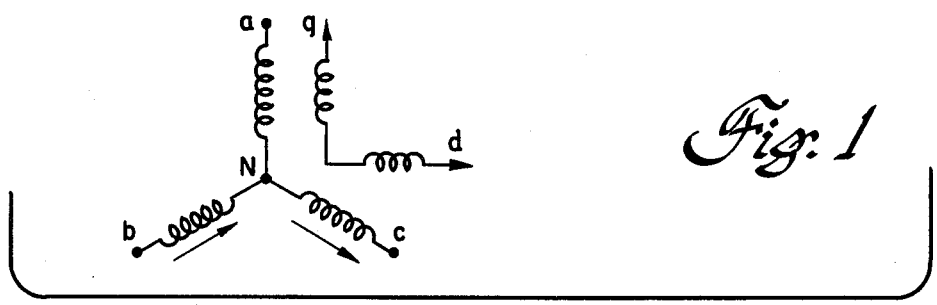
FIG. 1 is a sketch associated with a theoretical explanation of the invention, showing the three-phase stator windings of an induction motor and the equivalent two-phase windings along the direct ($d$) and quadrature ($q$) axis.

Before giving the equation for electromagnetic torque and explaining the basis of the invention from a theoretical standpoint, it is mentioned briefly that the analysis of the steady state and transient performance of a balanced three-phase induction motor is simplified by transforming the three-phase ac quantities into equivalent two-phase variables along two perpendicular axes, referred to as the direct ($d$) axis and the quadrature ($q$) axis. Thus, in FIG. 1, the wye-connected three-phase stator winding of an induction motor, assuming that phase winding $a$ is open-circuited while phase windings $b$ and $c$ are conducting current, can be replaced by two mutually perpendicular phase windings along the $q$ and $d$ axes. Electromagnetic torque is due to the superimposed interactions of the $d$-axis magnetic field cross-coupled with $q$-axis magnetomotive force and the $g$-axis magnetic field cross-coupled with $d$-axis magnetomotive force. For further information, reference may be made to allowed copending application, Ser. No. 729,042, filed on Oct. 4, 1976 by J. D. D'Atre, T. A. Lipo, and A. B. Plunkett for "Means for Stabilizing an AC Electric Motor Drive System", assigned to the same assignee as this invention.

Figure 6:
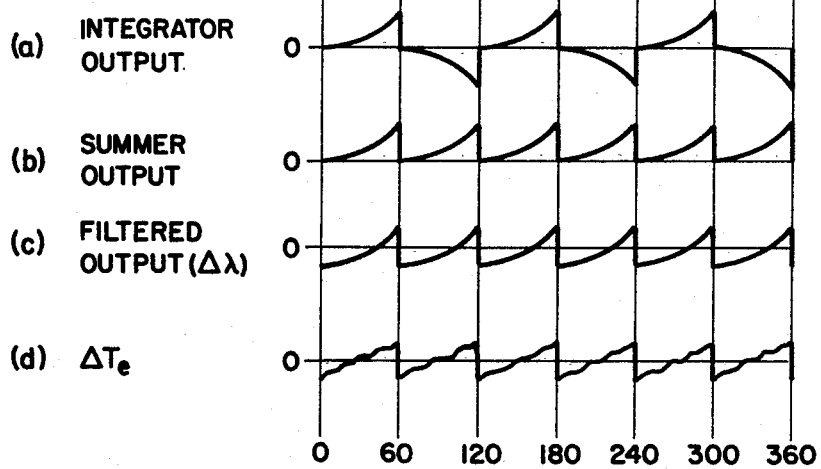
FIGS. 6a–6d show the flux signal waveforms at several points in the computation circuit of FIG. 3 and the pulsating torque component signal at the output.

In per unit, the instantaneous electromagnetic torque can be expressed by the relation $$T_e = \lambda_{md} i_{qs} - \lambda_{mq} i_{ds} \tag{1}$$

where $\lambda_{md}$ and $\lambda_{mq}$ are the $d$ and $q$ axes air gap flux linkages mutually linking the stator and rotor windings, and $i_{qs}$ and $i_{ds}$ are the d and q axes stator currents. Although equation (1) is valid for the synchronously rotating or any rotating reference frame, it is valid in particular when the reference frame is stationary. That is, $$T_e = \lambda_{md}^s i_{qs}^s - \lambda_{mq}^s i_{ds}^s \tag{2}$$

where the superscript $s$ denotes the stationary reference frame. It can be shown that in this reference frame, the $d$-axis can be located in the axis of maximum current, i.e., maximum MMF. In a current source inverter motor drive, one of these inverter output phases is conducting positive current, one phase is conducting negative current, and one phase is "floating" or not conducting. Over a typical interval, for example over the 300° to 360° interval of FIGS. 4, 5, and 6, $i_a = 0$, $i_b = -I_d$, $i_c = I_d$. If the $q$ axis is now aligned with phase $a$ as in FIG. 1, it can be determined that $$i_{ds}^s = I_d, \tag{3}$$

where $I_d$ is the dc link or inverter input current. In this case, the current in the axis normal to this direction, namely the $q$-axis, is identically 0 or $$i_{qs}^s = 0. \tag{4}$$

Substituting equations (3) and (4) into (2), $$T_e = -\lambda_{mq}^s i_{ds}^s = -\lambda_{mq}^s I_d. \tag{5}$$

Equation (5) indicates a means of calculating the instantaneous pulsating component of electromagnetic torque. By definition, the $q$-axis is located in the direction of zero stator current, then by definition, the stator current component in the $d$-axis (normal to the the $q$-axis) is $I_d$. In general, one of the three stator phases is always zero so that the open circuit voltage across this phase is the time derivative of the flux in this axis. Integration of this open circuit voltage yields the $q$-axis flux which when multiplied with the $d$-axis current, i.e., the dc link or inverter input current, yields the torque.

A simpler, intuitive explanation of the invention is as follows. At any one time, changing at 60° intervals, two phase windings are conducting and the current in the other is zero. When the current in a phase winding is zero, there is a sinusoidal voltage impressed across the winding which corresponds to the air gap voltage. The integral of this voltage is the motor air gap flux. Instantaneous torque is the product of the mutually perpendicular air gap flux and stator current, where the stator current corresponds to the dc link current. This technique computes only the instantaneous pulsating component of torque, and does not compute average torque because the point of starting the integration is a function of the inverter thyristor switching and is arbitrary. The shape of the integral is the pulsating component, however, and is independent of the average value of torque.

Figure 2:
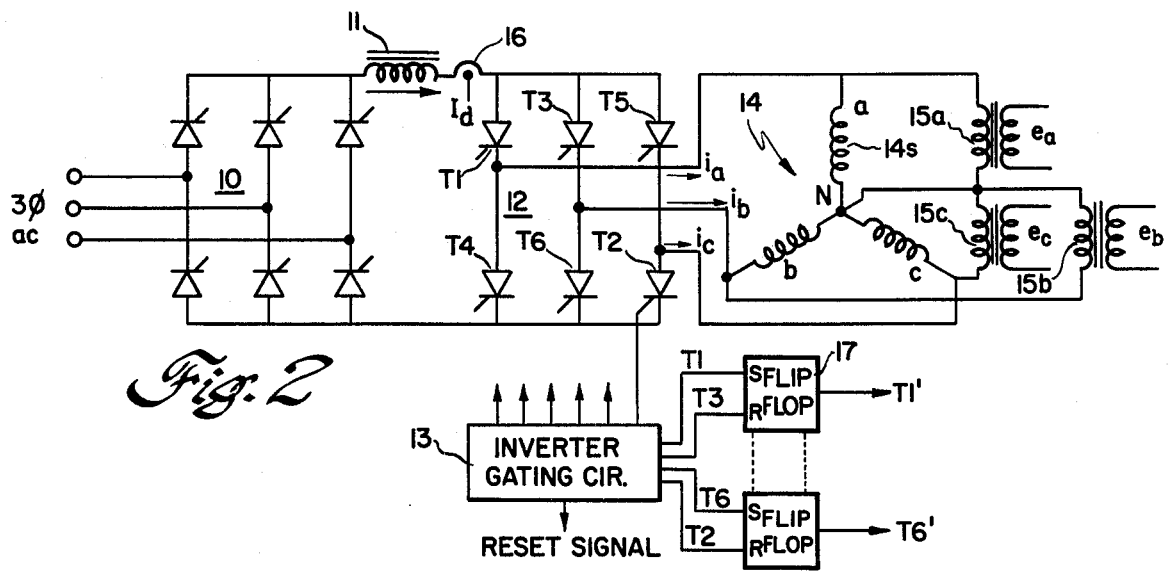
FIG. 2 is a schematic circuit diagram of a controlled current induction motor drive system with the addition of sensors according to the exemplary embodiment of this invention.
Figure 3:
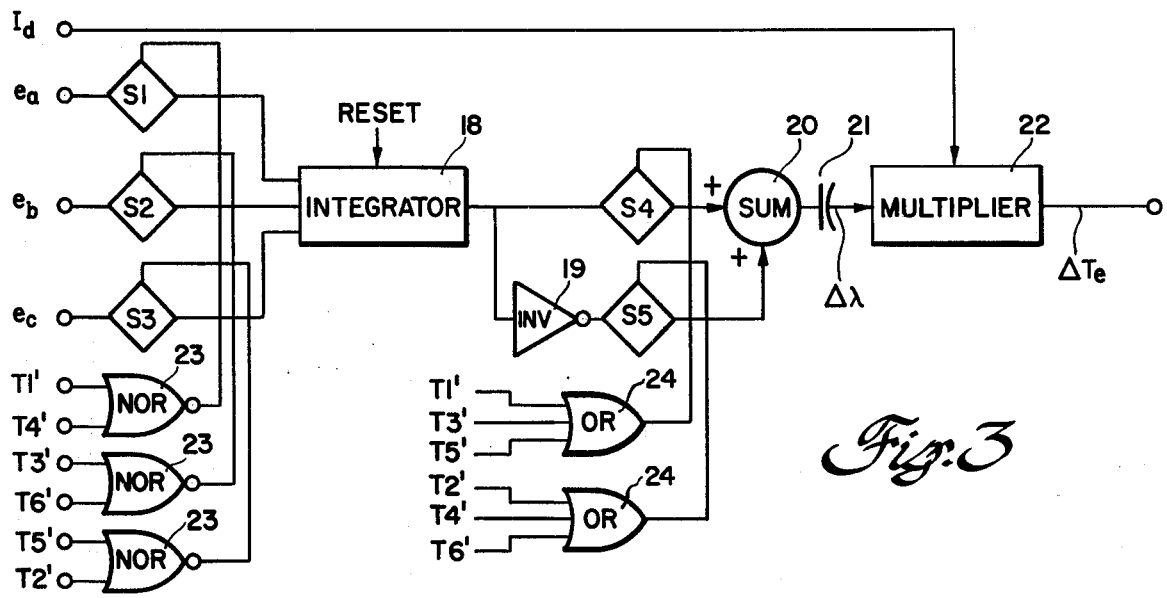
FIG. 3 is a block diagram of the preferred form of pulsating torque computation circuit.

FIGS. 2 and 3 depict the preferred implementation of the circuit and method for measuring the instantaneous pulsating component of electromagnetic torque for use as a cogging feedback variable in an adjustable frequency, current source inventer, induction motor drive.

In FIG. 2, the current source is a phase controlled rectifier 10 energized by a three-phase, 60 Hz ac voltage source which supplies adjustable rectified output voltage to a smoothing inductor 11 in the dc link to control the inverter input current $I_d$. Current source inverter 12 is a polyphase thyristor bridge inverter such as the improved autosequential commutated inverter disclosed in U.S. Pat. No. 3,980,941 to R. F. Griebel, assigned to the assignee of this invention, the disclosure of which is incorporated herein by reference. An inverter gating circuit 13 of conventional design generates gating signals to sequentially fire thyristors T1–T6 in the order of their numbering. The commutation details are not shown, but in the autosequential commutated inverter a conducting thyristor is turned off by means of the parallel capacitor commutation mechanism upon supplying a gating pulse to the next thyristor in sequence in the positive bank or negative bank, and blocking diodes in series with the thyristors serve to isolate the commutating capacitors from load 14, which is a three-phase induction motor or other polyphase motor. This inverter has the capability of commutating under light load, permits motor reversing by reversing the phase sequence, and is capable of regenerative operation under braking mode conditions to return power to the supply provided that phase controlled rectifier 10 is operated as a line commutated inverter. Other controlled current inverters are known in the art and can be used in the practice of the invention, including the third harmonic auxiliary commutated inverter with one commutating capacitor and the auxiliary impulse commutated inverter with three commutating capacitors.

Figure 4:
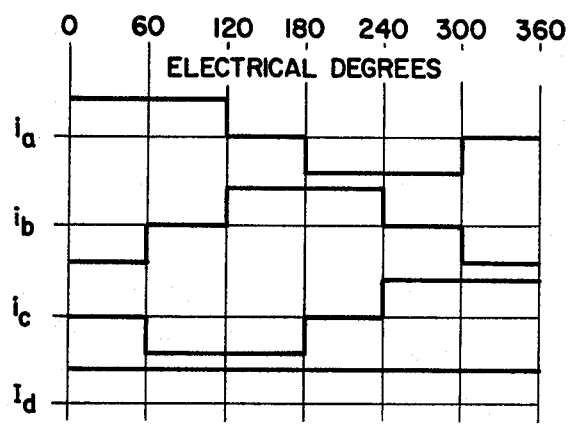
FIG. 4 illustrates idealized inverter output and input current waveforms assuming the input current is constant.
Figure 5:
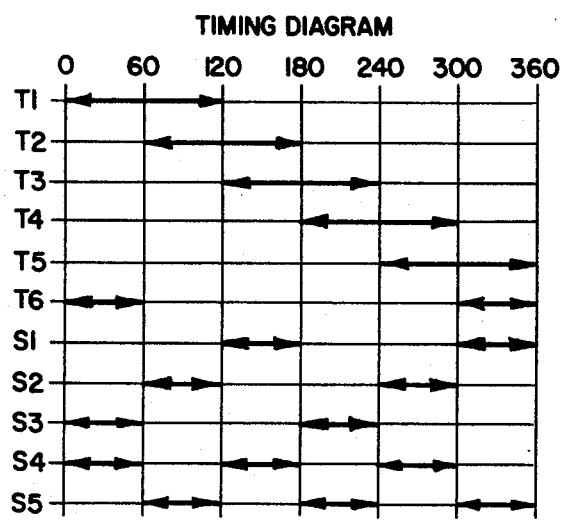
FIG. 5 is a timing diagram for the inverter thyristors in FIG. 2 and the switches in FIG. 3.

FIG. 4 illustrates the idealized three-phase nonsinusoidal inverter output currents $i_a$, $i_b$, and $i_c$, assuming that the dc link or input current $I_d$ is constant. The stator current supplied to each phase winding 14s of the induction motor, of course, corresponds to the inverter output current and has the same magnitude as the dc link current $I_d$, since in effect the inverter thyristors operate to switch the dc link current among the three output lines. It is evident that adjusting the rectifier output voltage changes the magnitude of the dc link current and thus the stator current, while adjusting the inverter operating frequency changes the stator excitation frequency. Feedback loops for accomplishing this are not shown. The output current in each phase ideally has a rectangular waveshape with a 120° duration in each half-cycle, neglecting commutation. Since the per phase rectangular wave output currents are 120° displaced from one another, at any moment two stator windings 14s are conducting while the remaining phase is open-circuited. The combination of conducting and open-circuited phases changes every 60° or six times per cycle.

Since the motor current is a 120° square or rectangular wave, because of the phase-to-phase commutation, the fifth and seventh harmonics of the motor frequency are present in the motor current in addition to the fundamental motor frequency, and also the eleventh and thirteenth harmonics, and so on. Some harmonics, including the third, ninth, and fifteenth harmonics, are eliminated by the inverter configuration, and it will be realized that the higher order harmonics do not present as much of a problem because of their small magnitudes. The reverse phase sequence fifth harmonic and the forward phase sequence seventh harmonic interact with the fundamental to produce a sixth harmonic torque component in the motor's developed torque, and in similar fashion the eleventh and thirteenth harmonics interact to produce a twelfth harmonic torque component, and so on. For a six pulse inverter, the order of these harmonic or cogging torques is given by an integral multiple of the number of pulses. The cogging torque pulsations are objectionable at very low frequencies because it is at these low frequencies that the machine can respond to the harmonics in the motor current. By modulating the current $I_d$, the harmonic pulsations are substantially eliminated.

The sensed information needed to calculate the instantaneous pulsating component of electromagnetic torque by means of the computation circuit in FIG. 3 is indicated in FIG. 2. The instantaneous sinusoidal voltage across an open-circuited phase winding is sensed at the motor terminals and requires bringing out the neutral N. Transformers 15a, 15b, and 15c are connected between the appropriate motor terminals and generate signals $e_a$, $e_b$, and $e_c$. The magnitude of the stator current and the zero current intervals in each motor phase winding can be measured directly from the inverter output current, but it is more convenient to sense the level of inverter input current $I_d$, using any suitable sensor 16, and to process the inverter thyristor gating pulses to generate signals representative of the zero current intervals. Motor phase winding $a$ is supplied with current whenever either of series-connected thyristors T1 and T4 is conductive, and there is a 60° period in each half cycle when the current is zero (also see the timing diagram of FIG. 5). To generate a signal, hereafter designated T1′, corresponding to the conduction interval of thyristor T1, the gate pulse for T1 is fed to the set input, and the gate pulse for T3 to the reset input, of a flip-flop or latch 17. In similar fashion, pairs of gate pulses, one indicating turn-on of the device and the other the initiation of turn-off by the parallel commutation mechanism, are fed to a series of flip-flops to generate the signals T2′–T6′.

As was mentioned, there is a sinusoidal voltage across a phase winding during the zero current interval which corresponds to the motor air gap voltage, and the integral of this voltage is the air gap flux. By multiplying the inverter input current $I_d$ by flux, the pulsating component of torque is computed but not the average value. Phase winding voltages $e_a$, $e_b$, and $e_c$ are supplied, respectively, through switches S1, S2, and S3 to an integrator 18 which is reset after each commutation by means of a reset signal derived in inverter gating circuit 13. The opposite polarity air gap flux signals are fed directly through a switch S4, or through an inverter gate 19 and switch S5, to a summing circuit 20. The summed flux signals are high pass filtered in a capacitor 21 or its operational equivalent to remove the dc portion of the signal, and the filtered flux signals (Δλ) are multiplied with inverter input current $I_d$ in a multiplier 22. The circuit output is the pulsating component of electromagnetic torque $\Delta T_e$. FIGS. 6a–6d illustrate the waveforms at several stages in the computation circuit. The flux signal at the integrator output is a cosine function, and changes polarity at 60° intervals as the integrator is reset. The sinusoidal instantaneous phase winding voltages are successively integrated during the interval the current in that phase winding is zero. At the summer output the flux signals have the same polarity, and high pass filtering the flux signals rejects the dc component. If the dc link current $I_d$ is modulated rather than being constant, the modulation also shows up in the pulsating torque component signal $\Delta T_e$.

In FIG. 3, signals T1′ and T4′ are applied to a NOR logic gate 23, which produces an output closing switch S1 during the nonconducting intervals of thyristors T1 and T4 when phase winding $a$ is open-circuited. The timing diagram in FIG. 5 clarifies the operation. Switch S2 for gating voltage $e_b$ to the integrator, and switch S3 for gating voltage $e_c$, are controlled in the same manner by other NOR gates. At the integrator output, signals T1′, T3′, and T5′ are the inputs to an OR logic gate 24, so that switch S4 is closed by conduction of thyristors supplying positive polarity currents to the motor phase windings. Switch S5 associated with inverter gate 19 is closed, on the other hand, by the conduction of thyristors supplying negative polarity currents to the phase windings. In the case that the gating pulses are coextensive with the conduction of the thyristors, it will be recognized that the gating pulses can be applied directly to NOR gates 23 and OR gates 24. Integrator 18, summer 20, and multiplier 22 are preferably implemented by operational amplifier circuitry, but any conventional components can be used.

The method and circuit for measuring cogging torque or the instantaneous pulsating component of torque are also applicable to force commutated inverter (CCI) or load commutated inverter fed synchronous machines.

While the invention has been particularly shown and described with reference to a preferred embodiment thereof, it will be understood by those skilled in the art that various changes in form and details may be made therein without departing from the spirit and scope of the invention.

The invention claimed is:

1. A circuit for measuring the pulsating component of electromagnetic torque in an electric motor operated from a polyphase current source inverter comprising
   means for effectively sensing the amplitude of the nominally rectangular inverter current supplied by said current source inverter to the motor phase windings, the zero current intervals in each phase winding, and the instantaneous voltage across each phase winding, and for generating signals respectively representative thereof, and
   a computation circuit including means for successively integrating each phase winding voltage during the interval the current in that phase winding is zero to thereby produce signals representative of motor air gap flux, and further comprising means for filtering said flux signals to reject the direct-current component and for multiplying the flux signals by the inverter current signal to generate an output representing the instantaneous pulsating component of torque.

2. The circuit according to claim 1 wherein said computation circut further includes means for alternately inverting the flux signals produced by said integrating means and for summing said flux signals, and wherein said means for filtering said flux signals is a capacitor.

3. The circuit according to claim 2 wherein said means for effectively sensing the inverter current and generating a signal representative thereof is comprised by a current sensor for the input current to said current source inverter.

4. A circuit for measuring the pulsating component of electromagnetic torque in an electric motor operated from a current source inverter, said inverter being a polyphase thyristor bridge inverter controlled by gating signals generated in a control circuit, comprising current and voltage sensing means for generating signals representative of the input current to said current source inverter and of the instantaneous voltage across each motor phase winding, means for generating signals designating the zero current intervals in the phase windings, and a pulsating torque computation circuit comprising means for successively integrating each phase winding voltage during the interval the current in that winding is zero to thereby produce signals representative of motor air gap flux, means for summing said flux signals, means for filtering said flux signals to reject the direct-current component, and means for multiplying the filtered flux signals by the inverter input current signal to generate an output representing the instantaneous pulsating component of torque.

5. The circuit according to claim 4 wherein said means for generating signals designating the zero current intervals in the motor phase windings comprises means for processing the gating signals for each pair of series thyristors in said current source inverter which supply opposite polarity current to one of the phase windings to produce an output corresponding to the interval of nonconduction of both thyristors for controlling gating of the phase winding voltage signal to said integrating means.

6. The circuit according to claim 5 wherein said computation circuit further includes means for selectively inverting the flux signals produced by said integrating means before application to said summing means, and other means for processing said gating signals to control gating of said integrating means directly to said summing means and through said inverting means depending on the conduction of thyristors supplying positive or negative polarity currents to the motor phase windings.

7. The method of measuring the pulsating component of electromagnetic torque in an electric motor operated from a polyphase current source inverter comprising the steps of generating signals respectively representative of the amplitude of the noncontinuous nominally rectangular stator current supplied by said current source inverter to the stator phase windings, the zero current intervals in each phase winding, and the instantaneous voltage across each phase winding, successively integrating each phase winding voltage during the interval the current in that phase winding is zero to thereby produce signals representative of motor air gap flux, high pass filtering said flux signals to reject the direct-current component, and multiplying the filtered flux signals by the stator current signal to generate an output representing the instantaneous pulsating component of torque.

8. The method according to claim 7 wherein the step of generating a signal representative of the rectangular stator current comprises sensing the input current to said current source inverter and generating a signal representative thereof.

9. The method according to claim 8 wherein said current source inverter is a polyphase thyristor inverter controlled by gating signals generated in a control circuit and the step of generating signals representative of the zero current intervals in the stator phase windings comprises processing the gating signals for each pair of series thyristors which supply opposite polarity currents to an individual phase winding to produce an output corresponding to the interval of nonconduction of both thyristors for controlling gating of the phase winding voltage signal to an integrator in the integrating step.

10. The method according to claim 9 further including the step of alternately inverting the flux signals produced by the integrator and summing all the flux signals, and further processing the thyristor gating signals to control the inverting step in dependence upon the conduction of thyristors supplying positive or negative polarity stator currents to the phase windings.

* * * * *